US00RE39365E

(19) United States
(12) Reissued Patent
Zaydman

(10) Patent Number: US RE39,365 E
(45) Date of Reissued Patent: Oct. 31, 2006

(54) COMPACT SMOKING OVEN WITH A ROTATABLE FOOD SUPPORT

(76) Inventor: Mikhail Zaydman, 3029 Brighton 12 St., Apt. C7, Brooklyn, NY (US) 11235

(21) Appl. No.: 09/217,469

(22) Filed: Dec. 21, 1998

Related U.S. Patent Documents

Reissue of:
(64) Patent No.: 5,599,471
Issued: Feb. 4, 1997
Appl. No.: 08/258,732
Filed: Jun. 13, 1994

(51) Int. Cl.
*F27D 11/00* (2006.01)
*A47J 37/04* (2006.01)

(52) U.S. Cl. ..... 219/400; 99/421 H
(58) Field of Classification Search ..... 219/385–400, 219/405, 409, 382; 126/8, 59.5, 352, 480, 126/190, 194; 99/421 A, 421 H, 421 R, 421 P, 99/421 HH
See application file for complete search history.

(56) References Cited

U.S. PATENT DOCUMENTS 2,072,364 A * 3/1937 Gray et al. ..... 99/480
2,348,545 A * 5/1944 Kahn ..... 99/427
3,126,814 A * 3/1964 Brown ..... 99/421 A
3,566,777 A * 3/1971 Koziol ..... 99/427
3,789,824 A * 2/1974 Mason ..... 219/400
3,792,654 A * 2/1974 Turner ..... 99/427
3,817,166 A * 6/1974 McLain ..... 99/480
3,959,620 A * 5/1976 Stephen, Jr. ..... 219/386
4,130,052 A * 12/1978 Jacobson ..... 99/339
4,643,163 A * 2/1987 Martinez ..... 126/41 A
4,924,071 A * 5/1990 Jacobs ..... 219/400
4,982,657 A * 1/1991 Ghenic ..... 99/421 A
5,184,540 A * 2/1993 Riccio ..... 99/421 H
5,361,686 A * 11/1994 Koopman ..... 99/421 H
5,373,778 A * 12/1994 Moreth ..... 99/421 H
5,421,318 A * 6/1995 Unruh et al. ..... 126/25 A
5,431,093 A * 7/1995 Dodgen ..... 99/427
5,562,022 A * 10/1996 Schmid et al. ..... 99/421 H
5,970,854 A * 10/1999 Tsai ..... 99/421 H

* cited by examiner

*Primary Examiner*—Tu Ba Hoang

(57) ABSTRACT

A compact smoking oven [comprises] *with a rotatable food support having* a [box-shaped] housing [having] *with* a peripheral wall composed of two wall portions spaced from one another and including an inner wall portion provided with a plurality of throughgoing openings, a container for accommodating wooden chips and having at least one wall provided with a plurality of openings, a heating unit for the container so that when the container is heated and wooden chips inside the container are heated a smoke is produced which exits the container through the openings in the container, then enters a space inside the peripheral wall and exits the space through the openings of the inner wall portion into an interior of the housing, and [means for] *having a rotatable and removable* holder for a food product to be smoked by the smoke.

20 Claims, 13 Drawing Sheets

COMPACT SMOKING OVEN WITH A ROTATABLE FOOD SUPPORT

Matter enclosed in heavy brackets [ ] appears in the original patent but forms no part of this reissue specification; matter printed in italics indicates the additions made by reissue.

BACKGROUND OF THE INVENTION

The present invention relates to a compact smoking oven.

Smoking ovens are known in the art. The known smoking ovens are formed as industrial installations which have great sizes, are provided with powerful and voluminous mechanisms and parts for smoking a significant quantity of food products, and are very expensive. It is desirable to provide a compact smoking oven which can be used in households by individual users and which do not require special skills for smoking food products.

SUMMARY OF THE INVENTION

Accordingly, it is an object of the present invention to provide a compact smoking oven which can be used in households by an individual user and does not require any special skills for smoking food products.

In keeping with these objects and with others which will become apparent hereinafter, one feature of the present invention resides, briefly stated, in a compact smoking oven which has a box-shaped housing having a peripheral wall composed of two wall portions spaced from one another and including an inner wall portion provided with a plurality of throughgoing openings, a container for accommodating wooden chips and having at least one wall provided with a plurality of openings, means for heating the container so that when the container is heated and wooden chips inside the container are heated a smoke is produced which exits the container through the openings in the container, then enters a space inside the peripheral wall and exits the space through the openings of the inner wall portion into an interior of the housing, and means for holding a food product to be smoked by the smoke.

When the smoking oven is designed in accordance with the present invention it is compact, has a simple construction, is easy to operate, and can be used in households by an individual user who does not have any special skills for smoking.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
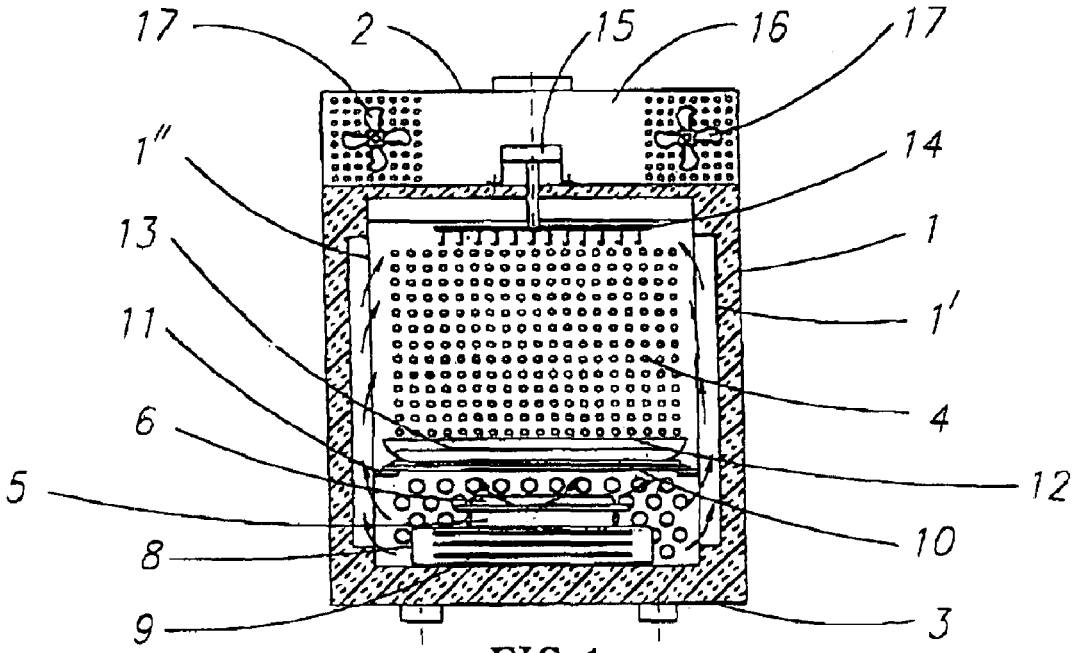
FIG. 1 is a front sectional view of a compact smoking oven in accordance with the present invention.
Figure 2:
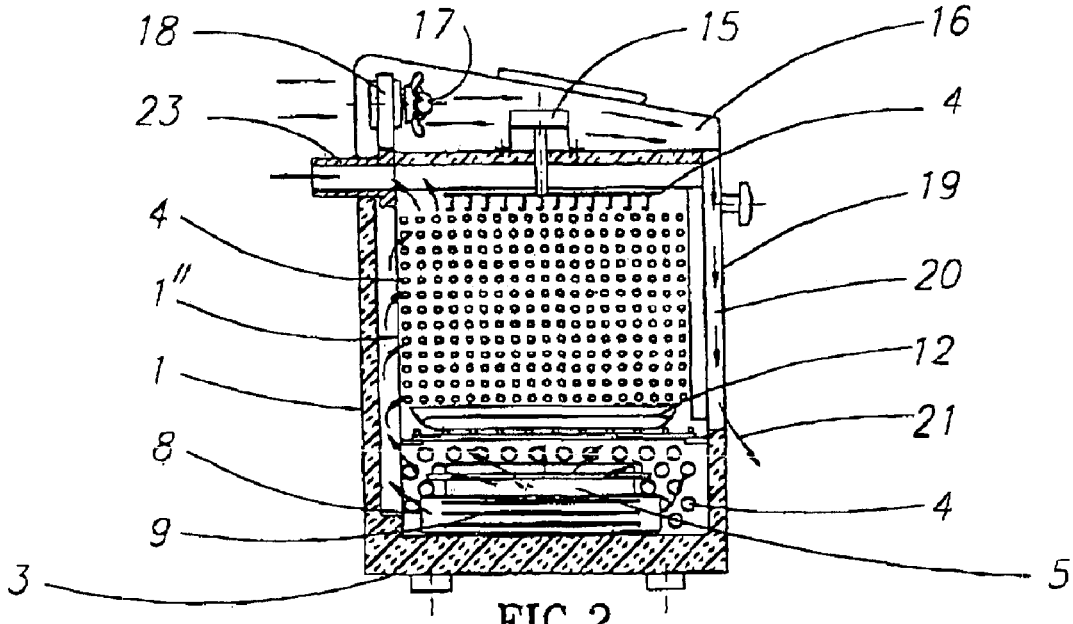
FIG. 2 is a sectioned side view of the smoking oven of FIG. 1.

A smoking oven shown in FIGS. 1 and 2 has a housing with a peripheral wall 1, a top wall 2 and a bottom wall 3. The peripheral wall 1 is formed as a double wall and has an outer wall portion 1' and an inner wall portion 1" which is provided with a plurality of perforations 4. The smoking oven further has a container 5 for accommodating wooden chips. The container 5 has an upper wall 6 which is also provided with a plurality of perforations. The lower wall of the container 6 is inserted into an inner space of a housing 8 of heating means. The heating means also include a heating element 9 formed for example as an electrical heating element connectable with a source of electric current (not shown). A lower grill 10 is located on a support 11 and in turn supports a tray for fat collection and for heat distribution, and a louver 13 for food defrosting is arranged on the tray 12.

The smoking oven further has a food product supporting means which is formed as a rotatable disc 14 provided with a plurality of hooks. The disc is connected with a shaft which is rotated by a motor 15. The motor 15 is accommodated in an upper compartment 16 which is separated from the interior of the housing by the upper wall 2. Fans 17 are accommodated in the compartment 16 and are rotatable by electric motors 18.

The interior of the housing is closeable and operable by a door 19 which has a double wall and an inner space 20 between two wall portions of the double wall and an exit opening 21.

The smoking oven in accordance with the present invention as shown in FIGS. 1 and 2 operates in the following manner:

A food product to be smoked is introduced into the interior of the housing and is suspended on the hooks of the rotatable support 14. Wood chips are introduced into the interior of the container 5 and the container is placed through the upper opening of the heater housing 8 so that the lower closed wall of the container 5 is located at a distance above the electrical heating element 9 of the heater. Electric current is supplied to the electrical heating element, the electrical heating element heats the air inside the heater housing 8, the heated air heats the bottom wall and the peripheral wall of the container 5, through the openings 6. The smoke is deflected toward the openings of the inner wall portion of the peripheral wall of the housing into the inner space between the inner wall portion 1" and the outer wall portion 1', then the smoke passes through the openings 4 of the inner wall portion 1" and enters the interior of the housing so as to smoke the food product suspended on the support 14. At the same time, the fans 17 are rotated by the motors 18, cool the air and cause flow of air over the upper wall 2 of the housing so as to [heat] *cool* the upper wall and also into the interior space 20 of the double wall 19 so as to cool the double wall and to provide gas tightness of the interior of the housing. Fat from the food product is collected in the tray.

Figure 3:
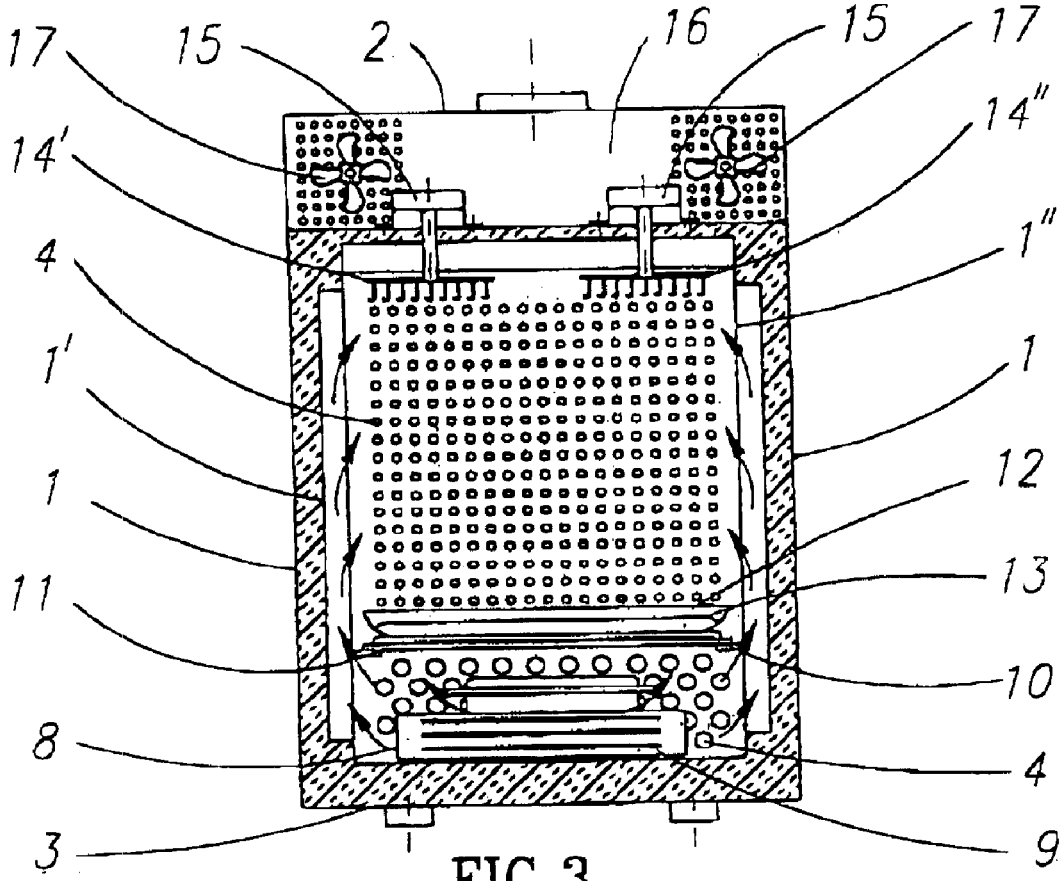
FIG. 3 is a sectioned front view of the oven in accordance with another embodiment of the present invention.

In the embodiment of FIG. 3, the food product supporting means include two discs 14' and 14" provided with a plurality of hooks and rotatable independently from one another.

Figure 4:
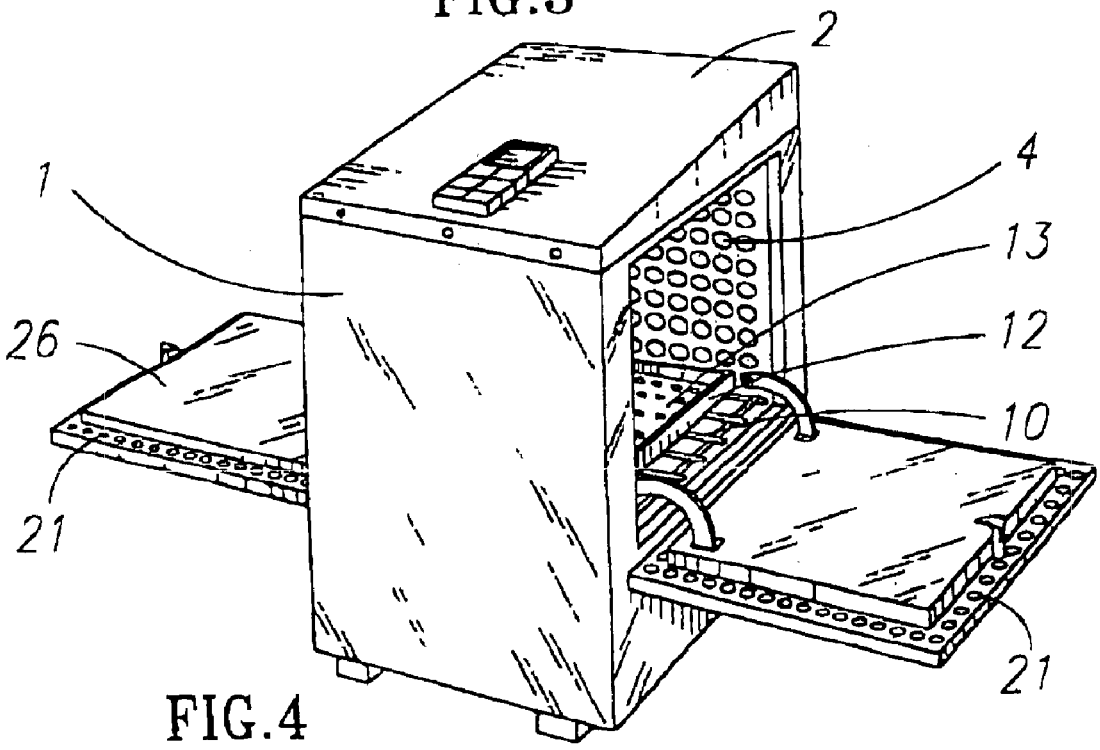
FIG. 4 is a perspective view of the smoking oven in accordance with a further embodiment of the present invention.
Figure 5:
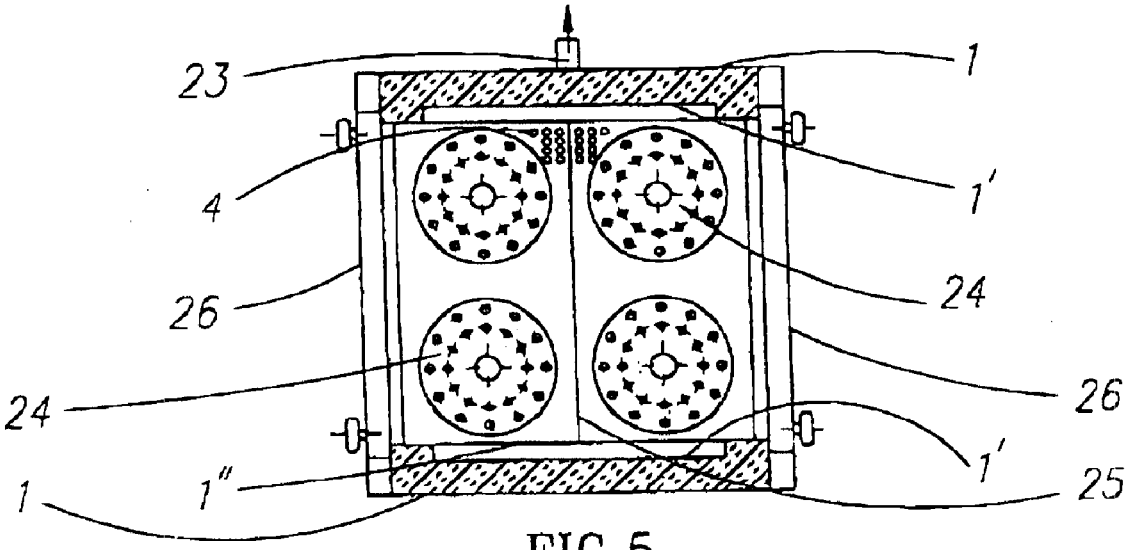
FIG. 5 is a view from below of an upper wall of a housing of the smoking oven of FIG. 4.

In the embodiment of FIGS. 4 and 5, the food product supporting means include four discs 24 provided with a plurality of hooks, and the grouped so that two discs 24 are located in one compartment of the housing while two other discs 24 are located in another compartment of the housing separated from the first mentioned compartment by a partition 25. The housing has two doors 26 which provide access to a corresponding compartment.

Figure 6:
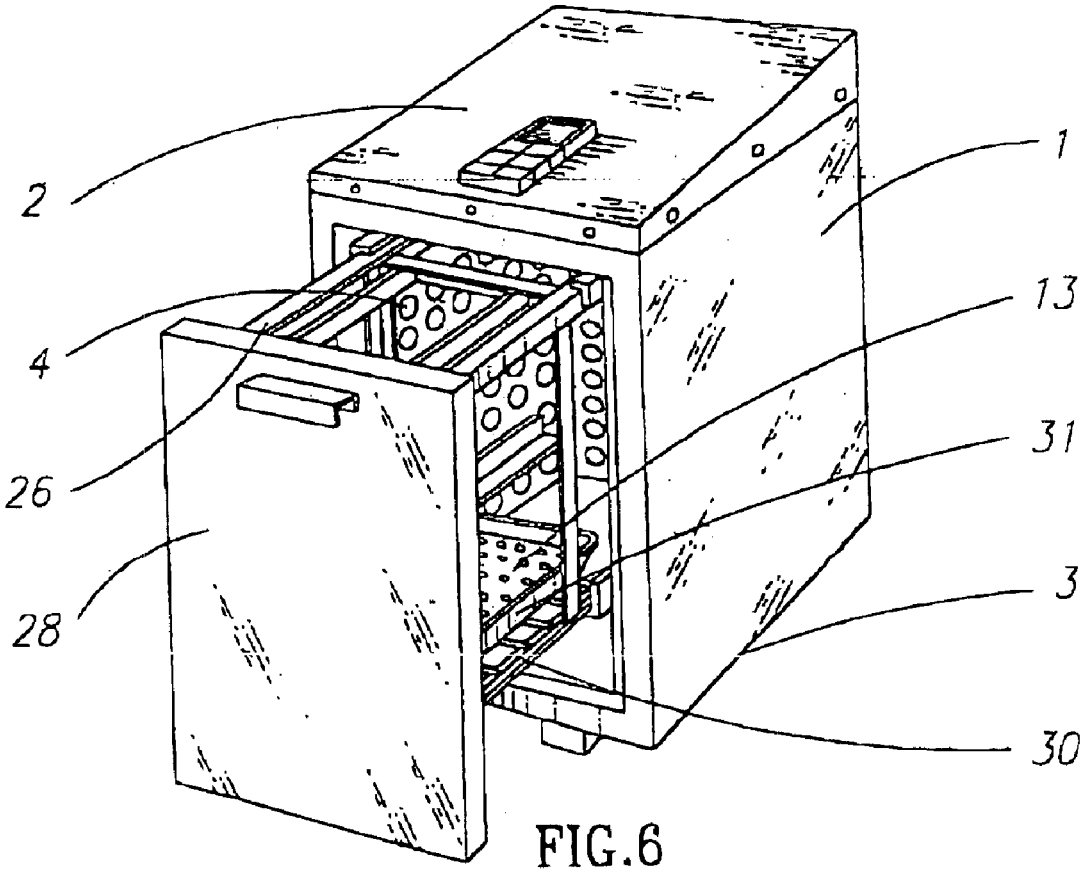
FIG. 6 is a perspective view of a smoking oven in accordance with still a further embodiment of the present invention.
Figure 7:
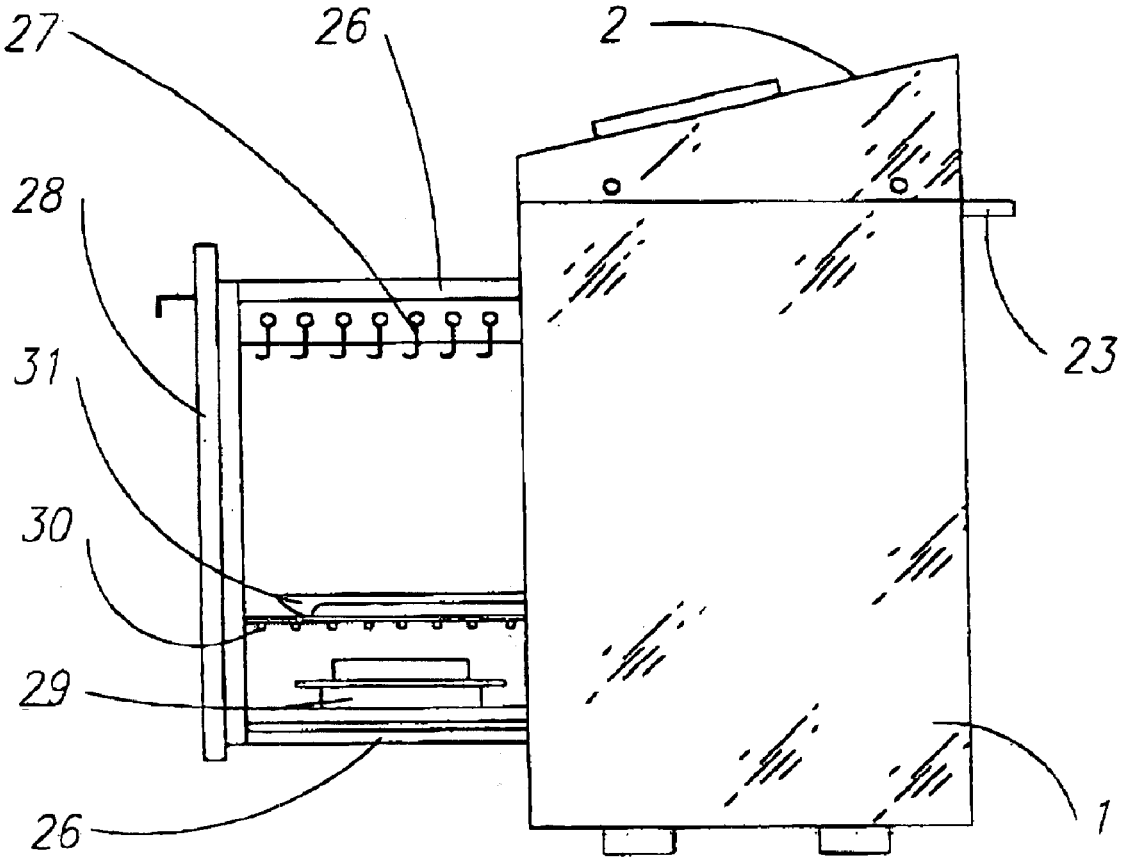
FIG. 7 is a side view of the smoking oven of FIG. 6.

In the embodiment shown in FIGS. 6 and 7, the food product supporting means include a plurality of rods 26 provided with hooks 27 and connected with a door 28. The container for wood chips 29, the heater 30 as well as the tray 31 are also connected with the door 28. After smoking the door is displaced outwardly of the housing, and the food product supporting means 26, 27 are also located outside of the housing so as to remove the smoked product and to put a new smoked product on the hooks.

Figure 9:
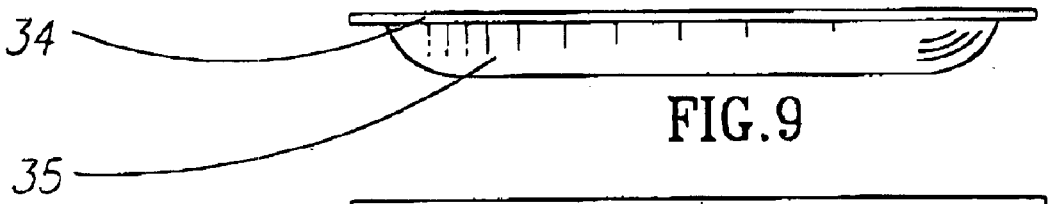
FIGS. 9 and 10 are a side view and a view from below of a flame distributing element with a metal plate of the smoking oven of FIG. 8.
Figure 10:
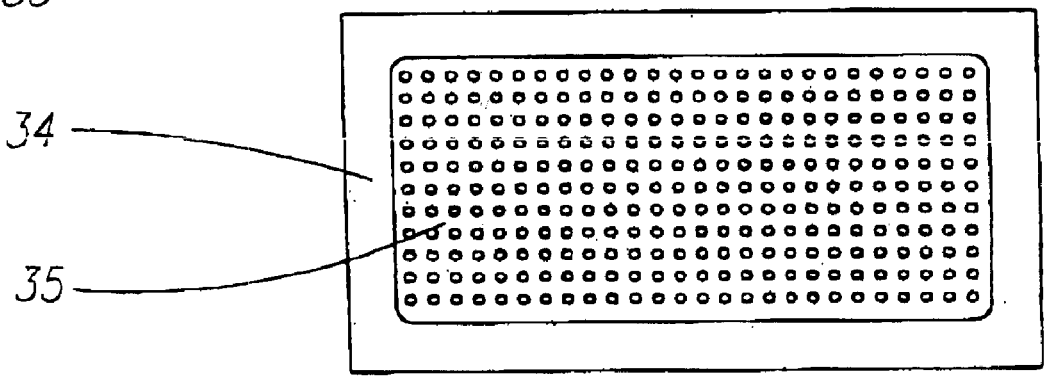
Figure 8A:
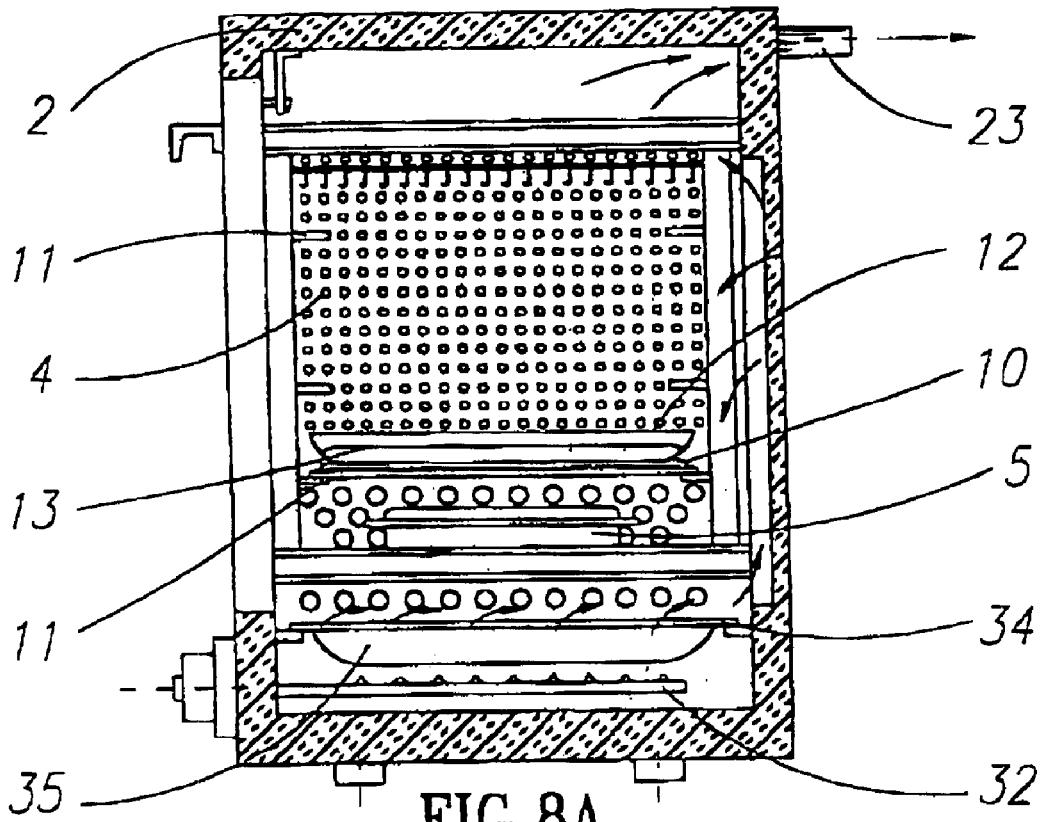
FIGS. 8A and 8B are section front view and a section side view of another embodiment of the smoking oven.
Figure 8B:
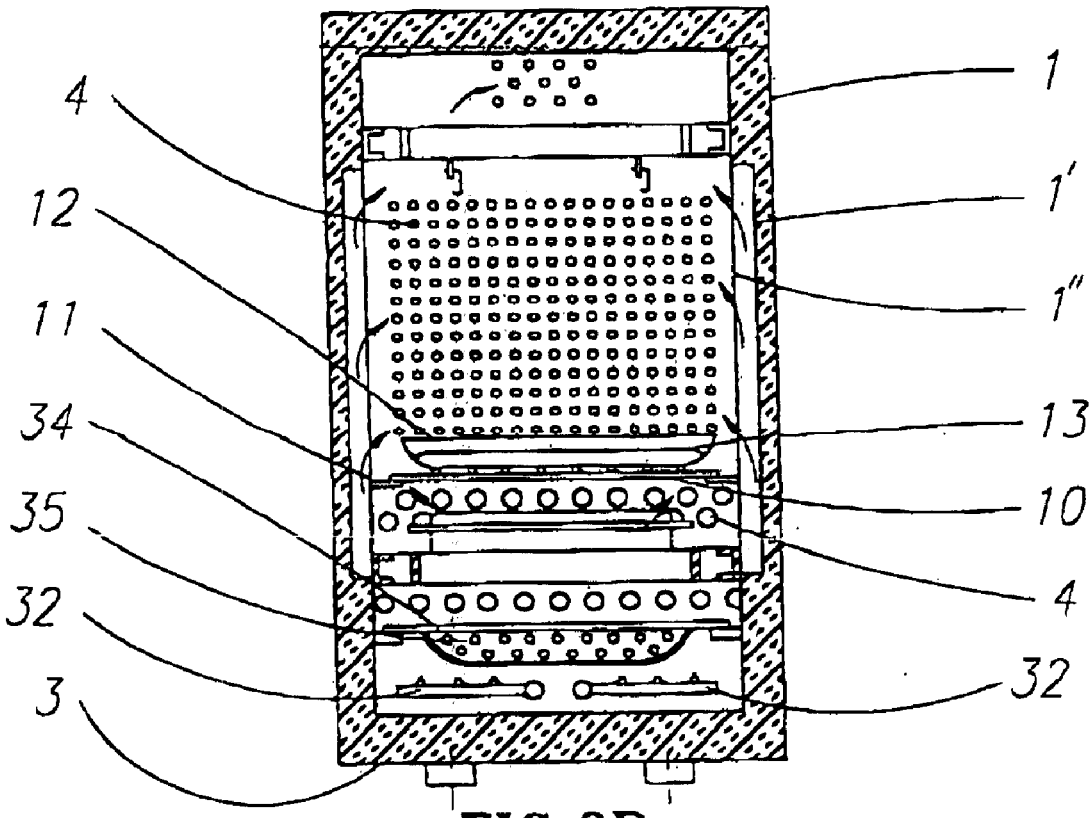

In the embodiment of FIGS. 8A–8B, a heater is formed as a gas heater 32 connected with a source of gas and having one outlet opening at its right end in FIG. 4 or a plurality of openings distributed over the pipe 23. A heat accumulating element 34 in FIGS. 9–10 formed for example as a metal plate is located above the flame and separated from the latter by a flame distributing element 35 which is formed for example as a concave sheer provided with a plurality of perforations. The combination of the elements 34, 35 provides for a uniform distribution of the heat to the container 5 which accommodates the wooden chips.

Figure 11A:
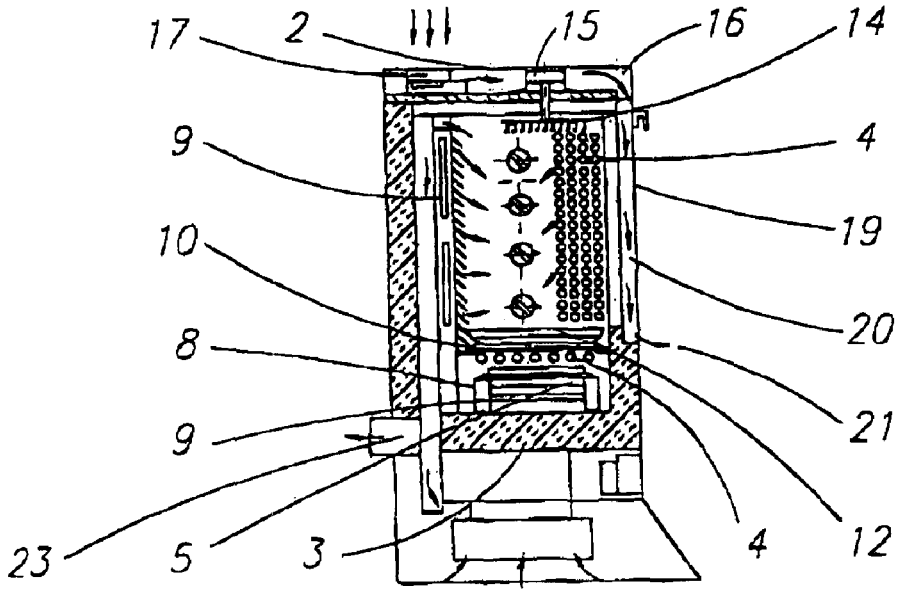
FIGS. 11A–11B are views showing a section side view and a section front view of a further embodiment of the inventive smoking oven.
Figure 11B:
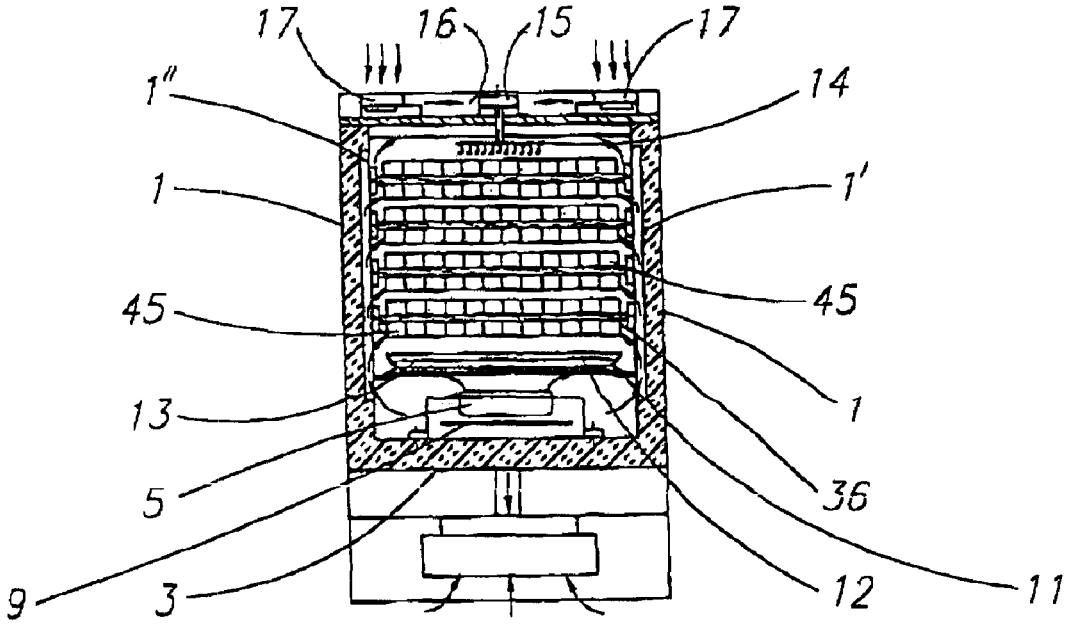
Figure 12A:
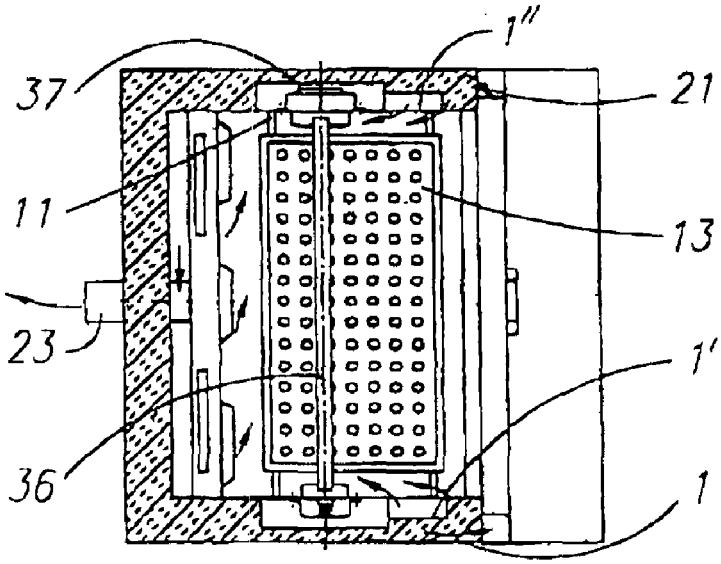
FIGS. 12A–12C are views showing a plan view of a smoking oven with a horizontal rod for supporting food products, and an end view of the rod, and a motor used for turning the rod.
Figure 12B:
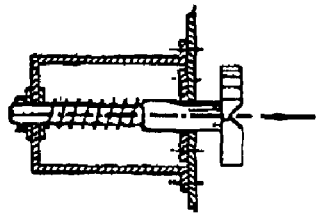
Figure 12C:
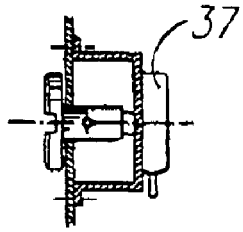

In the embodiment of FIGS. 11A, the food product supporting means in addition to the rotatable disc 14 provided with a plurality of hooks also has a plurality of horizontal rods 36. As can be seen from FIGS. 12A–12C, the rod 36A can be turned around its axis by a motor 37.

Figure 13A:
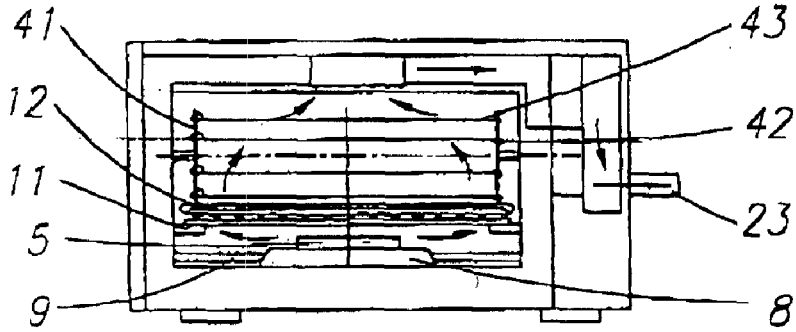
FIGS. 13A–13B are views showing a smoking oven with a plurality of rods mounted on two discs and with a drill, correspondingly.
Figure 13B:
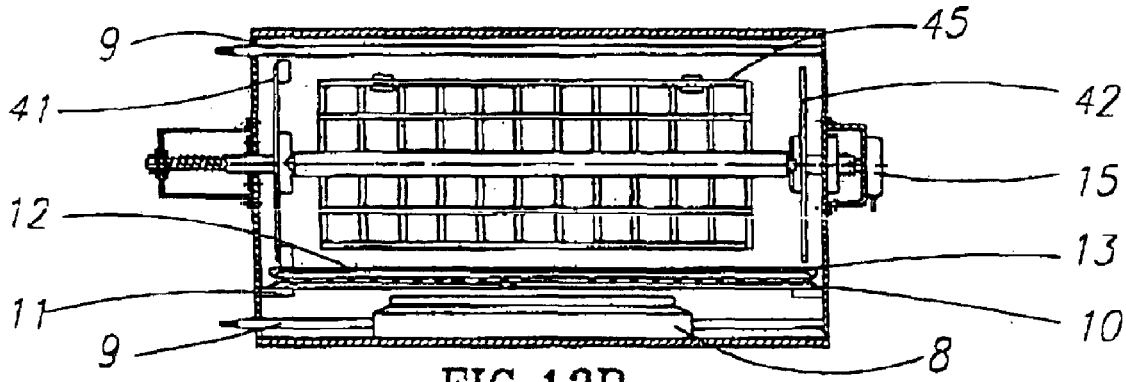
Figure 14A:
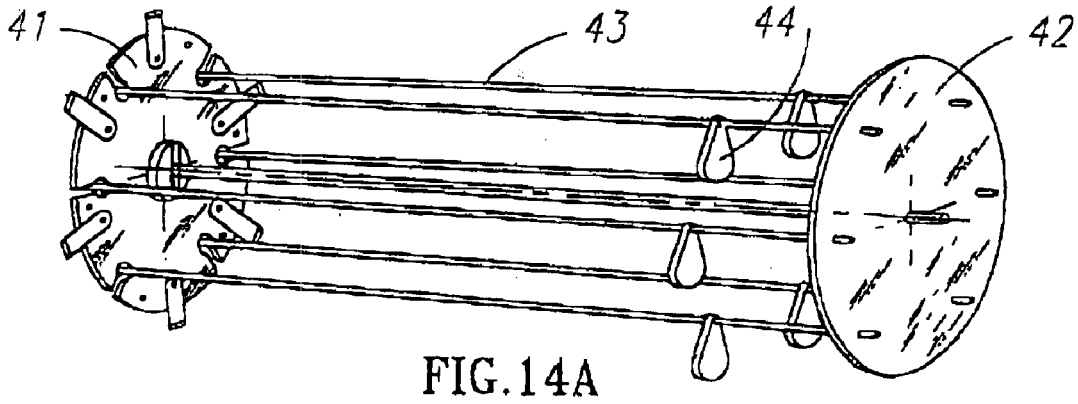
FIGS. 14A–14C are views showing a food product supporting unit with discs and a plurality of fronts on a perspective view, a view of one end of the food product supporting unit, and an end view of a fragment of one disc.
Figure 14C:
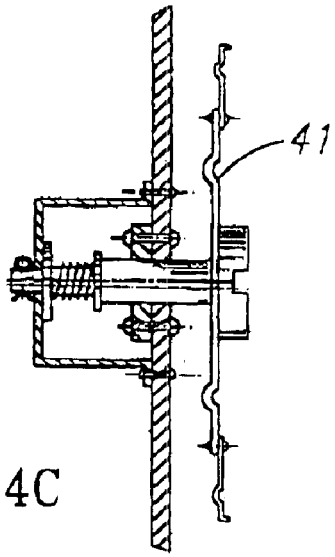
Figure 14B:
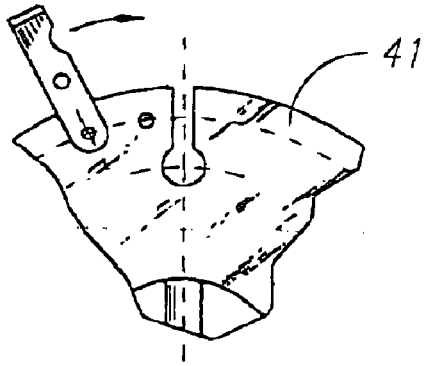
Figure 15A:
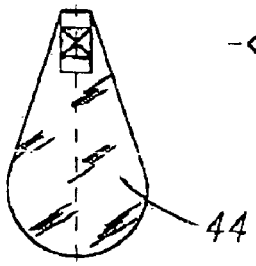
FIGS. 15A and 15B show a flywheel separately from the rod.
Figure 15B:
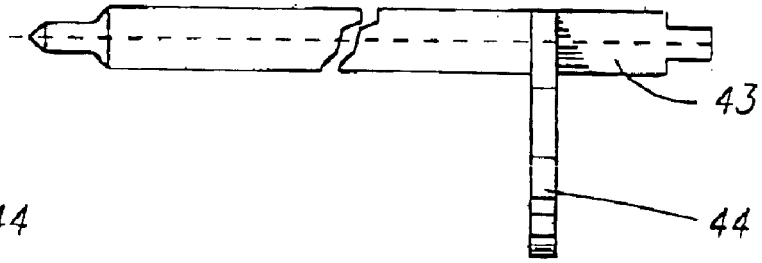

In the embodiment shown in FIGS. 13A–13B the food product supporting means include two discs 41 and 42 which are rotatable by not shown electric motors and a plurality of rods 43 mounted on the discs spaced from one another in a circumferential direction. As can be seen from FIG. 14A–14C, one end of each rod is inserted through the slot of the disc 41 and locked there by a turnable flap, while the other end of the same rod extends through a corresponding opening in the disc 42. As can be seen from FIGS. 15A–15B, each rod is provided with a flywheel 44 which is fixedly connected with the respective rod, while the rods are turnably mounted in the slots and openings of the discs 41 and 42. When the discs are rotated about their joint axes, the rods 43 are rotated about these axes as well. At the same time, since the flywheel 44 tends to retain its vertical position, it turns each rod with which it is connected around its own axis. Thus, during rotation of the discs, the food product on the rods gradually turns so that each portion of the food product is uniformly heated.

Figure 16:
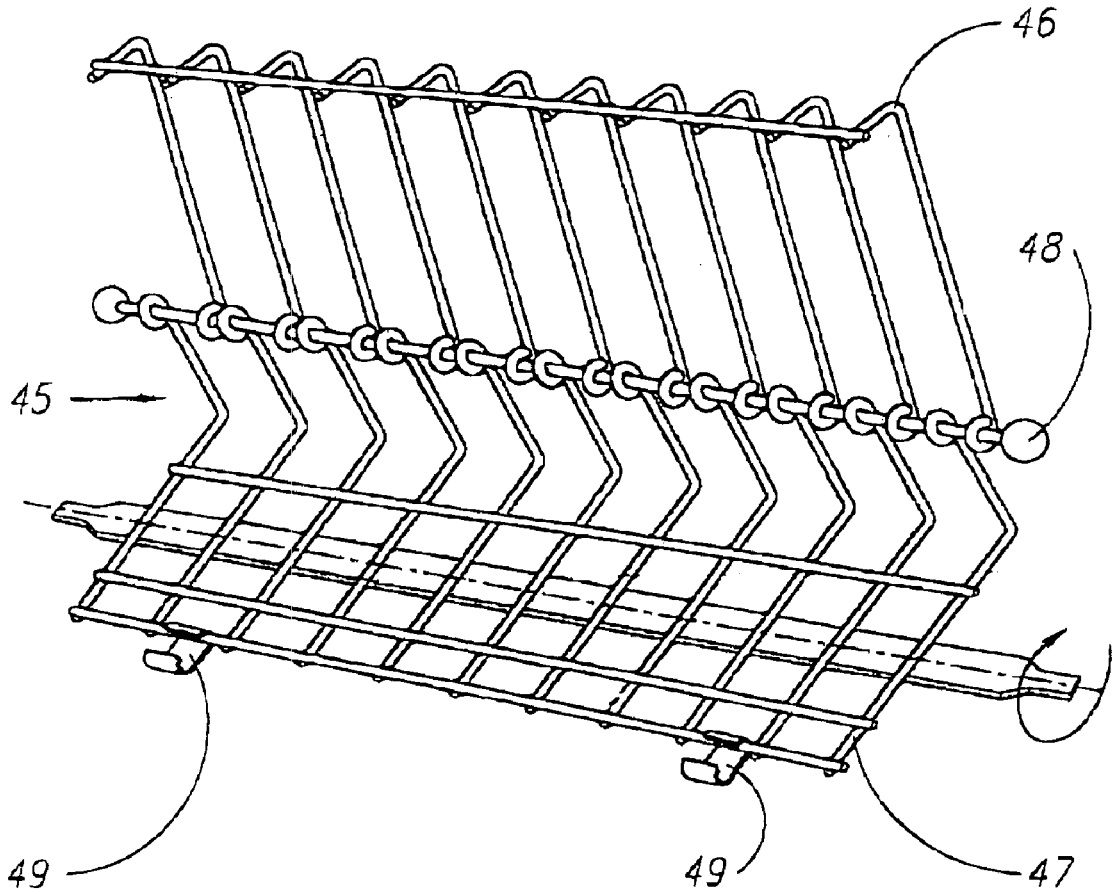
FIG. 16 is a view showing a further modification of food product supporting means formed as a foldable unfoldable grade.
Figure 17A:
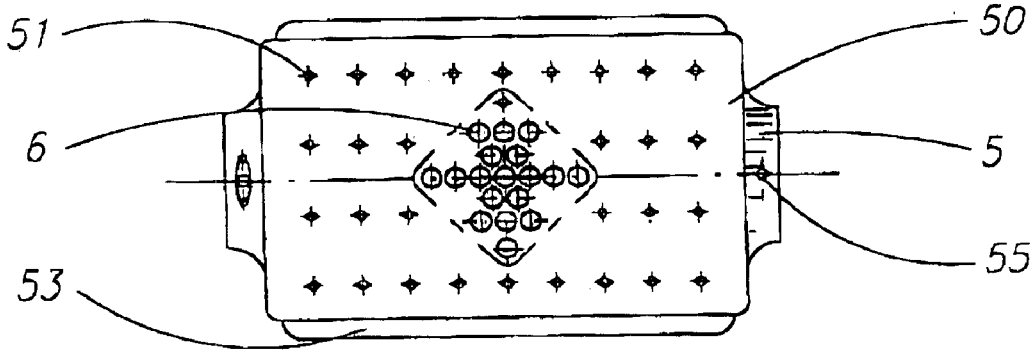
FIGS. 17A–17E are a plan view, a front view, a side view, a fragment of the plan view and a perspective view of a container for accommodating wood chips.
Figure 17B:
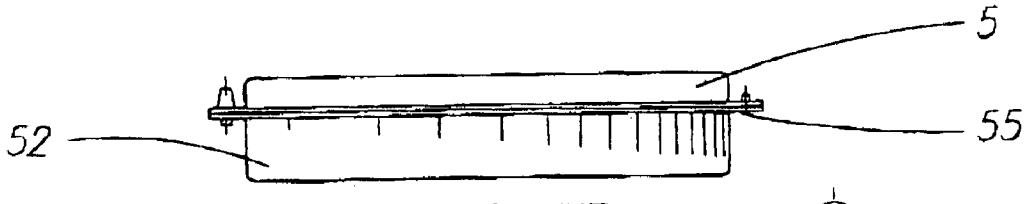
Figure 17D:
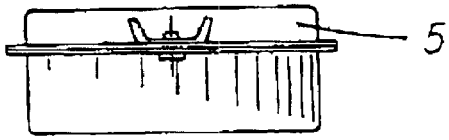
Figure 17C:
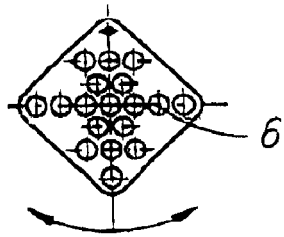
Figure 17E:
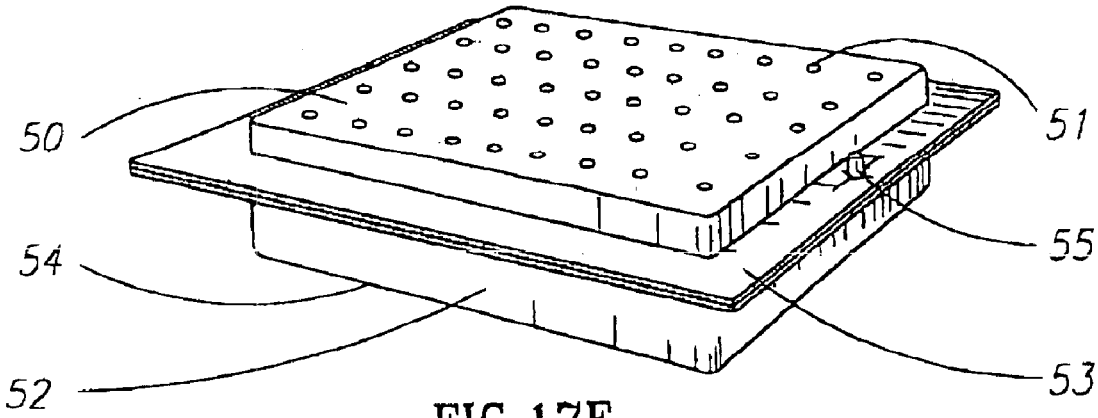

In the embodiment of FIG. 16, the food product supporting means include a grill 45 composed of two grill portions 46 and 47 pivotally connected with one another by a pivot axle 48. The grill portions 46 and 47 can be opened so as to insert a food product, and then closed so as to enclose the food product in their interior, and then locked by locking means 49 in the closed position.

FIGS. 17A–17E illustrates a container 5 for accommodating wooden chips, as can be seen, the container 5 has an upper wall 50 provided with a plurality of openings 51, a peripheral wall 52 provided with a holding flange 53, and a lower wall 54. The holding flange 53 is provided with means 55 for connecting the container with the housing of the heater located underneath the container, for example, formed as threaded openings for screws and the like.

Figure 18A:
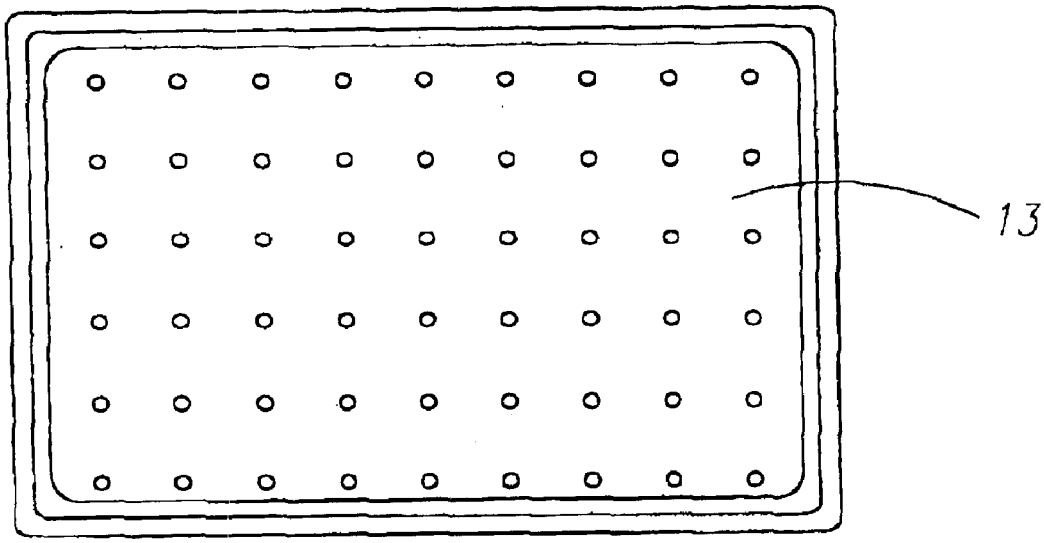
FIGS. 18A–18C are a plan view, a side view and a section [or] *of* a tray with a louver for food defrosting of the inventive smoking oven.
Figure 18B:
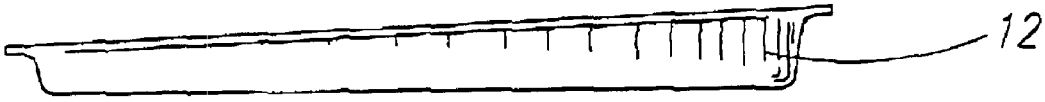
Figure 18C:
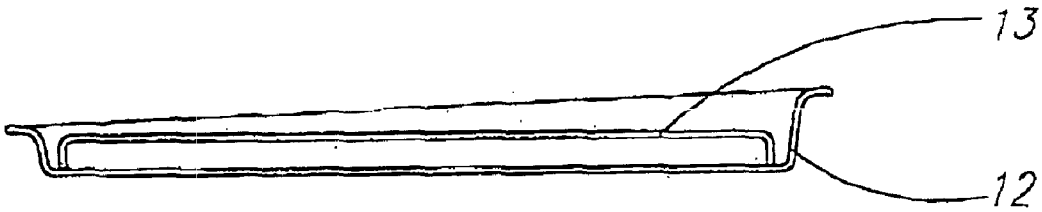

FIGS. 18A–18C are different plan views, side views and sections of the tray.

FIGS. 11A–[11C] *11B* are [a plan view,] a side view and *a front view, showing* a section of a tray 12 with a louver 13 for food defrosting, of the compact smoking oven.

In all embodiments, the housing 1, the compartment 16, the container 5, the door 28, the unit 10–12 are designed as in the embodiment of FIGS. 1–2.

Figure 19:
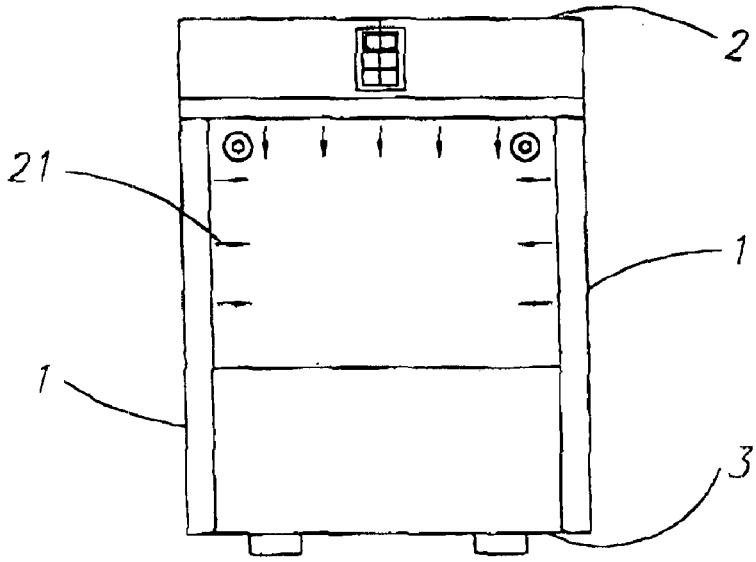
FIGS. 19–22b are views of the smoking oven, showing different embodiments of air flow for door sealing.
Figure 20:
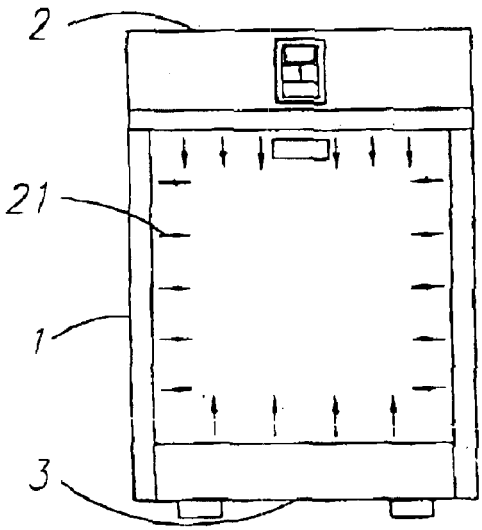
Figure 21:
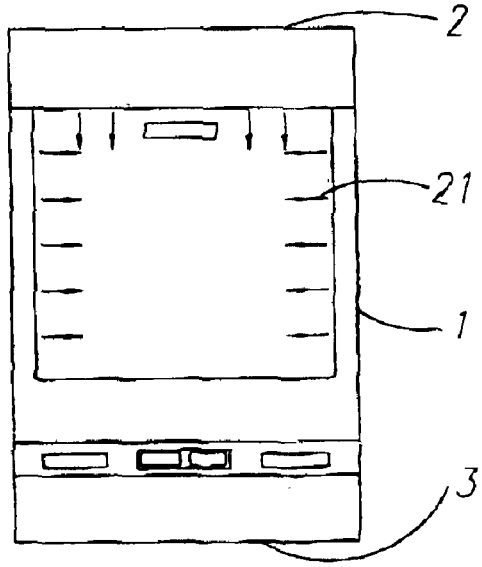
Figure 22B:
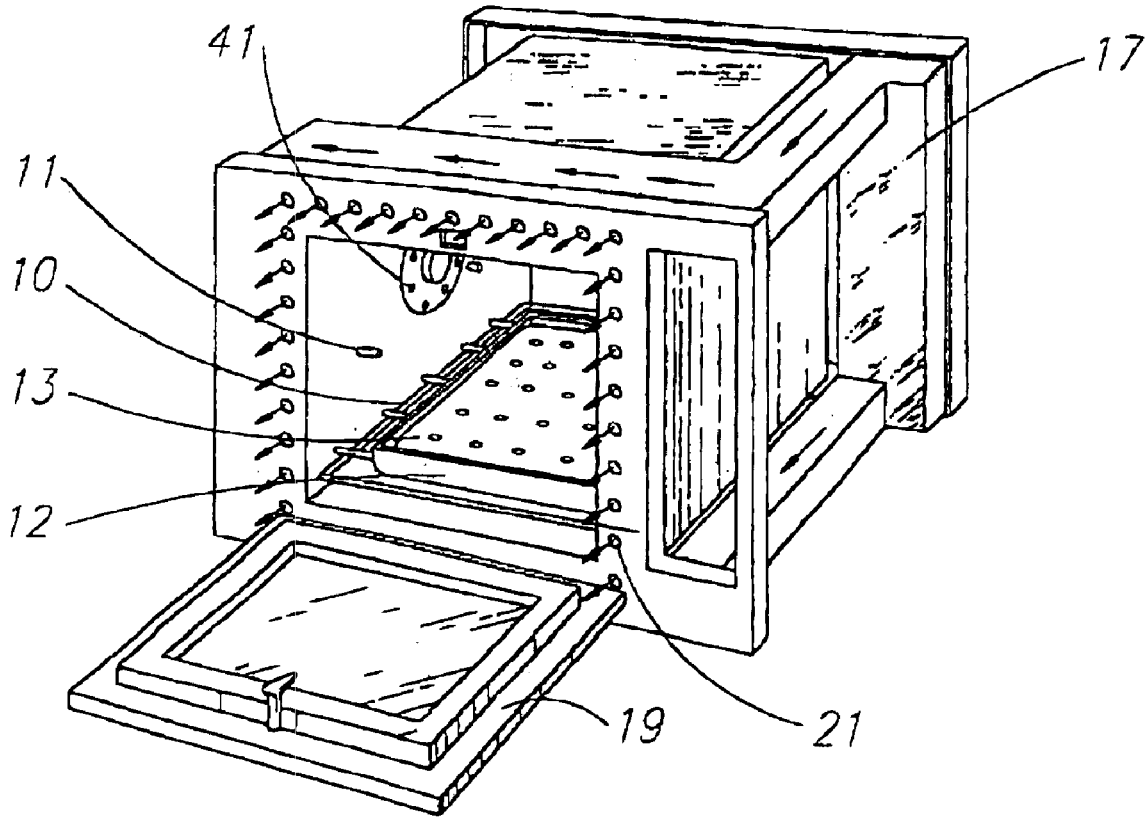
Figure 22A:
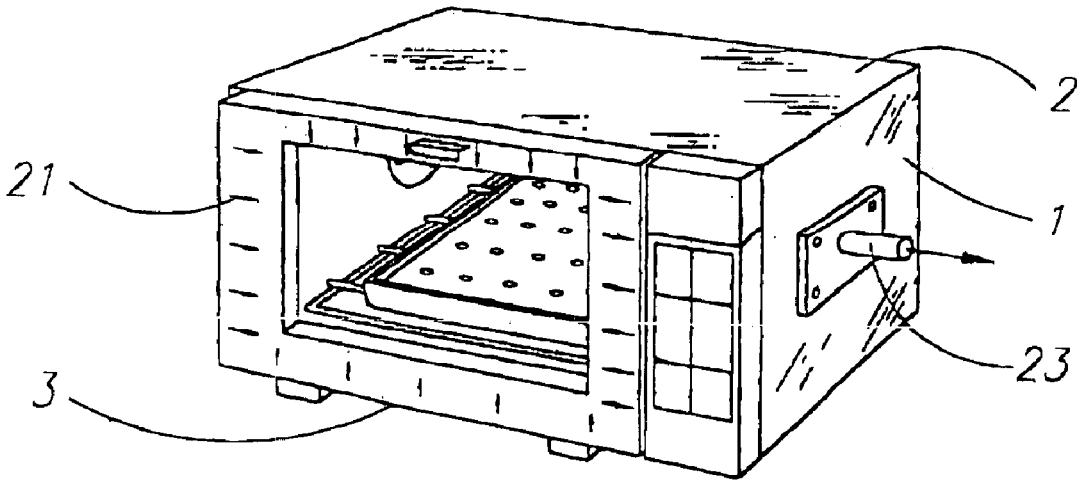

FIGS. 19–21 show front views and FIGS. 22A and 22B show perspective views of the inventive smoking oven with different directions of air flow to provide sealing of the oven door.

It will be understood that each of the elements described above, or two or more together, may also find a useful application in other types of constructions differing from the types described above.

While the invention has been illustrated and described as embodied in a compact smoking oven, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A compact smoking oven, comprising a [box-shaped] housing having a peripheral wall [composed of] *comprising* two wall portions spaced from one another and including an inner wall portion provided with a plurality of throughgoing openings and an outer wall portion; a container for accommodating wooden chips and having at least one wall provided with a plurality of openings; means for heating said container so that when said container is heated, wooden chips inside said container are heated to produce a smoke, said smoke enters a space between said inner wall portion and said outer wall portion of said peripheral wall and exits said space through said openings of said inner wall portion into an interior of said inner wall portion of said peripheral wall; means for holding a food product to be smoked by said smoke; and means for cooling said housing, said housing having an upper compartment separated from an interior of said housing by an upper wall, said cooling means being located in said upper compartment and directing cool air toward said upper wall so as to cool said upper wall.

2. A compact smoking oven as defined in claim 1, wherein said heating means include a heater located underneath said container with wooden chips so as to heat a bottom of said container and thereby to heat the wooden chips.

3. A compact smoking oven as defined in claim 2, wherein said heater is formed as an electric heater.

4. A compact smoking oven as defined in claim 1[; and] further comprising [product supporting means; and] *a sloping* tray means located above said container and below said [product supporting means] *means for holding said food product* so as to collect fat and deflect smoke exiting said openings of said container toward said peripheral wall.

5. A compact smoking oven, comprising a [box-shaped] housing having a peripheral wall composed of two wall portions spaced from one another and including an inner wall portion provided with a plurality of throughgoing openings and an outer wall portion; a container for accommodating wooden chips and having at least one wall provided with a plurality of openings; means for heating said container so that when said container is heated, wooden chips inside said container are heated to produce a smoke, said smoke enters a space between said inner wall portion and said outer wall portion of said peripheral wall and exits said space through said openings of said inner wall portion into an interior of said inner wall portion of said peripheral wall; and food product supporting means including two discs rotatable about a horizontal axis and a plurality of rods extending substantially horizontally and inserted in said discs.

6. A compact smoking oven as defined in claim 5, wherein one of said discs has a plurality of throughgoing openings for inserting one end of said rods, while the other of said discs has a plurality of closeable and openable slots for inserting the other end of said rods.

7. A compact smoking oven as defined in claim 5, wherein said rods are additionally turnable about their axes; and further comprising means for additionally turning said rods about said axes.

8. A compact smoking oven as defined in claim 7, wherein said means for turning said rods about their axes including at least one flywheel connected with each rod and formed so that when said discs rotate and rotate all said rods, each of said rods is rotated about its axis in an opposite direction under the action of said flywheel tending to assume a substantially vertical position.

9. A compact smoking oven, comprising a [box-shaped] housing having a peripheral wall composed of two wall portions spaced from one another and including an inner wall portion provided with a plurality of throughgoing openings; a container for accommodating wooden chips and having at least one wall provided with a plurality of openings and an outer wall portion; means for heating said container so that when said container is heated, wooden chips inside said container are heated to produce a smoke, said smoke enters a space between said inner wall portion and said outer wall portion of said peripheral wall and exits said space through said openings of said inner wall portion into an interior of said inner wall portion of said peripheral wall; means for holding a food product to be smoked by said smoke; an openable hollow door which closes and opens the interior of said housing; and cooling means for cooling air and supplying it into an interior of said hollow door so as to cool said door and to increase tightness of an interior of said housing to prevent smoke escape from said housing.

10. A compact smoking oven, comprising a [box-shaped] housing having a peripheral wall composed of two wall portions spaced from one another and including an inner wall portion provided with a plurality of throughgoing openings; a container for accommodating wooden chips and having at least one wall provided with a plurality of openings and an outer wall portion; means for heating said container so that when said container is heated, wooden chips inside said container are heated to produce a smoke, said smoke enters a space between said inner wall portion and said outer wall portion of said peripheral wall and exits said space through said openings of said inner wall portion into an interior of said inner wall portion of said peripheral wall; and food product supporting means located in said housing and including at least one [support provided with at least two rotatable discs having different axes of rotation and] *rotatable disc having* a plurality of hooks for suspending the food product.

11. A compact smoking oven, comprising a [box-shaped] housing having a peripheral wall composed of two wall portions spaced from one another and including an inner wall portion provided with a plurality of throughgoing openings and an outer wall portion; a container for accommodating wooden chips and having at least one wall provided with a plurality of openings; means for heating said container so that when said container is heated, wooden chips inside said container are heated to produce a smoke, said smoke enters a space between said inner wall portion and said outer wall portion of said peripheral wall and exits said space through said openings of said inner wall portion into an interior of said inner wall portion of said peripheral wall; means for holding a food product to be smoked by said smoke, said heating means including a gas heater, a metal plate [heater] *heated* by said gas heater and located above said gas heater and underneath said container; and a flame distributor located between said gas heater and said metal plate and having a plurality of perforations so as to distribute and direct gas flame to said metal plate in a distributed fashion.

12. A compact smoking oven, comprising a [box-shaped] housing having a peripheral wall composed of two wall portions spaced from one another and including an inner wall portion provided with a plurality of throughgoing openings and an outer wall portion; a container for accommodating wooden chips and having at least one wall provided with a plurality of openings; means for heating said container so that when said container is heated, wooden chips inside said container are heated to produce a smoke, said smoke enters a space between said inner wall portion and said outer wall portion of said peripheral wall and exits said space through said openings of said inner wall portion into an interior of said inner wall portion of said peripheral wall; and food product supporting means including at least one rod rotatable about a horizontal axis and having a support displaceable in an axial direction for removal of the food product, *said food product supporting means is entirely removable from said compact smoking oven without disassembly for loading and unloading said food product.*

13. A compact smoking oven, comprising a [box-shaped] housing having a peripheral wall composed of two wall portions spaced from one another and including an inner wall portion provided with a plurality of throughgoing openings and an outer wall portion; a container for accommodating wooden chips and having at least one wall provided with a plurality of openings; means for heating said container so that when said container is heated, wooden chips inside said container are heated to produce a smoke, said smoke enters a space between said inner wall portion and said outer wall portion of said peripheral wall and exits said space through said openings of said inner wall portion into an interior of said inner wall portion of said peripheral wall; food product supporting means including [a] *at least one* grate composed of at least two portions movable between a position in which said [grates] *portions* are located close to one another so as to enclose a food product therebetween, and an open position in which said grate portions are moved, two discs rotatable about a horizontal axis with [on] *at least one* of said discs displaceable in an axial direction; and [a] *at least one* turnable rod located between said rotatable discs and supporting said grate, *said food product supporting means is entirely removable from said compact smoking oven without disassembly for loading and unloading said food product.*

14. A compact smoking oven, comprising a [box-shaped] housing having a peripheral wall composed of two wall portions spaced from one another and including an inner wall portion provided with a plurality of throughgoing openings and an outer wall portion; a container for accommodating wooden chips and having at least one wall provided with a plurality of openings; means for heating said container so that when said container is heated, wooden chips inside said container are heated to produce a smoke, said smoke enters a space between said inner wall portion and said outer wall portion of said peripheral wall and exits said space through said openings of said inner wall portion into an interior of said inner wall portion of said peripheral wall; means for holding a food product to be smoked by said smoke; a door adapted to close and to open said housing; and food product supporting means connected with said door so that when said door opens, said food product supporting means are located outside of said housing for loading and unloading said food product means.

*15. A compact smoking oven in accordance with claim 5, wherein said food product supporting means is entirely removable from said compact smoking oven without disassembly for loading and unloading of food product.*

*16. A rotatable food support in detachable combination with a compact smoking oven, comprising:*

*at least one rod for supporting a food product to be smoked in said compact smoking oven, said rod being rotatably mounted within said compact oven, said rod having an axis and being rotatable about said axis;*

*at least one rotatable disc, said disc being detachably connected to said rod, so as to move said disc along said rod in an axial direction and so as to remove said food product from said rod; and*

*at least one grate for supporting said food product; said grate being removably attached to said at least one rod, said rod being configured to rotate together with said disc; wherein said at least one rod is inserted into said grate along a central line of said grate, wherein said grate is rotated around said axis of said at least one rod, wherein said rod is displaced between an interior wall of said compact oven and said rotatable disc, and wherein said rod and said disc are detachably mounted within said compact smoking oven so as to allow said rotatable food support to be removable from said compact smoking oven without disassembly for loading and unloading of said food product.*

*17. A rotatable food support in detachable combination with a compact smoking oven in accordance with claim 16, further comprising two of said rotatable discs, wherein said at least one rod being displaced between said two rotatable discs and wherein at least one of said two rotatable discs is detachably connected to said rod, so as to move said at least one detachably connected disc along said rod in the axial direction and so as to remove said food product from said rod.*

*18. A rotatable food support in detachable combination with a compact smoking oven, comprising:*

*at least one grate for supporting a food product to be smoked in said compact smoking oven, said grate being rotatably mounted on at least one rod located within said compact smoking oven, said rod having an axis and being rotatable about said axis;*

*at least two rotatable discs, said grate being mounted on said rod between said two rotatable discs, at least one of said discs being movable along said rod in an axial direction so as to allow removal of said food product from said grate;*

*wherein said discs are detachably mounted within said compact smoking oven so as to allow said rotatable food support to be removable from said compact smoking oven without disassembly for loading and unloading of said food product.*

*19. A rotatable food support in combination with a compact smoking oven, comprising:*

*at least one grate for supporting a food product to be smoked in said compact smoking oven, said grate being rotatably mounted on at least one rod located within said compact oven, said rod having an axis and being rotatable about said axis; said rod being inserted into said gate along a central line of said grate, said grate being rotatable around said axis of said at least one rod, said grate being composed of at least two portions movable between a position in which said portions are located close to one another so as to enclose a food product therebetween, and an open position in which said grate portions are moved apart so as to load or unload said food product.*

*20. A rotatable food support in combination with a compact smoking oven in accordance with claim 19, wherein said at least one grate for supporting said food product is entirely removable from said compact smoking oven without disassembly for loading and unloading of said food product.*

* * * * *